(12) United States Patent
Paulrud

(10) Patent No.: US 11,553,685 B2
(45) Date of Patent: Jan. 17, 2023

(54) CONTROL UNIT, METHOD AND COMPUTER PROGRAM FOR A MILKING SYSTEM

(71) Applicant: DELAVAL HOLDING AB, Tumba (SE)

(72) Inventor: Carl Oskar Paulrud, Tumba (SE)

(73) Assignee: DeLaval Holding AB, Tumba (SE)

( * ) Notice: Subject to any disclaimer, the term of this patent is extended or adjusted under 35 U.S.C. 154(b) by 34 days.

(21) Appl. No.: 16/968,786

(22) PCT Filed: Feb. 7, 2019

(86) PCT No.: PCT/SE2019/050101
§ 371 (c)(1),
(2) Date: Aug. 10, 2020

(87) PCT Pub. No.: WO2019/156619
PCT Pub. Date: Aug. 15, 2019

(65) Prior Publication Data
US 2020/0396953 A1 Dec. 24, 2020

(30) Foreign Application Priority Data
Feb. 9, 2018 (SE) .................................. 1850142-9

(51) Int. Cl.
*A01J 5/01* (2006.01)
*A01J 5/017* (2006.01)
(Continued)

(52) U.S. Cl.
CPC .................. *A01J 5/01* (2013.01); *A01J 5/007* (2013.01); *A01J 5/017* (2013.01); *A01J 5/0136* (2013.01); *A01J 5/04* (2013.01)

(58) Field of Classification Search
CPC .... A01J 5/01; A01J 5/017; A01J 5/007; A01J 5/0136
See application file for complete search history.

(56) References Cited

U.S. PATENT DOCUMENTS

| 5,704,311 A * | 1/1998 | van den Berg | A01J 5/007 |
| | | | 119/14.02 |
| 8,505,482 B2 * | 8/2013 | Sandberg | A01J 5/007 |
| | | | 119/14.02 |

(Continued)

FOREIGN PATENT DOCUMENTS

| DE | 36 09 275 | 9/1987 |
| WO | 01/89292 | 11/2001 |

(Continued)

OTHER PUBLICATIONS

Tančin et al., "Sources of Variation in Milk Flow Characteristics at Udder and Quarter Levels," Journal of Dairy Science, vol. 89, No. 3, American Dairy Science Association, 2006, pp. 978-988.

(Continued)

*Primary Examiner* — Joshua J Michener
*Assistant Examiner* — Edgar Reyes
(74) *Attorney, Agent, or Firm* — Nixon & Vanderhye

(57) ABSTRACT

An automatic milking system controlled by receiving a parameter representing a measured flow of milk extracted from at least one teat of an udder of an animal being milked in a milking operation via at least one teatcup of the milking system, wherein the milking system is controlled to stop the milking operation based on a first criterion indicating that the flow has reached a decline phase, and a second criterion indicating that the flow decreases faster than a threshold slope, the milking operation being stopped in response to fulfillment of the second criterion on or after a point in time when the first criterion has been fulfilled. As a result, a particular amount of milk is left in the udder of the animal, irrespective of an overall milking time for the animal.

19 Claims, 3 Drawing Sheets

(51) Int. Cl.
*A01J 5/04* (2006.01)
*A01J 5/007* (2006.01)
*A01J 5/013* (2006.01)

(56) References Cited

U.S. PATENT DOCUMENTS

| | | | | |
|---|---|---|---|---|
| 8,616,154 | B2 * | 12/2013 | Schrader | A01J 5/048 |
| | | | | 119/14.02 |
| 8,646,411 | B2 * | 2/2014 | Wartenhorst | A01J 5/048 |
| | | | | 119/14.02 |
| 2002/0148408 | A1 | 10/2002 | Gompper et al. | |
| 2007/0209595 | A1 | 9/2007 | Umegard et al. | |
| 2011/0247563 | A1 | 10/2011 | Schrader et al. | |
| 2011/0303155 | A1 | 12/2011 | Tucker, Jr. et al. | |
| 2012/0325153 | A1 * | 12/2012 | Mostert | A01J 5/007 |
| | | | | 119/14.02 |

FOREIGN PATENT DOCUMENTS

| | | | | |
|---|---|---|---|---|
| WO | WO-02054857 A1 * | 7/2002 | | A01J 5/007 |
| WO | 03/000042 | 1/2003 | | |
| WO | 2008/051137 | 5/2008 | | |
| WO | WO-2010068088 A1 * | 6/2010 | | A01J 5/007 |
| WO | WO-2012022356 A1 * | 2/2012 | | A01J 5/007 |

OTHER PUBLICATIONS

International Search Report for PCT/SE2019/050101 dated Apr. 15, 2019, 3 pages.
Written Opinion of the ISA for PCT/SE2019/050101 dated Apr. 15, 2019, 7 pages.
Swedish Search Report for SE 1850142-9 dated Sep. 14, 2018, 3 pages.

* cited by examiner

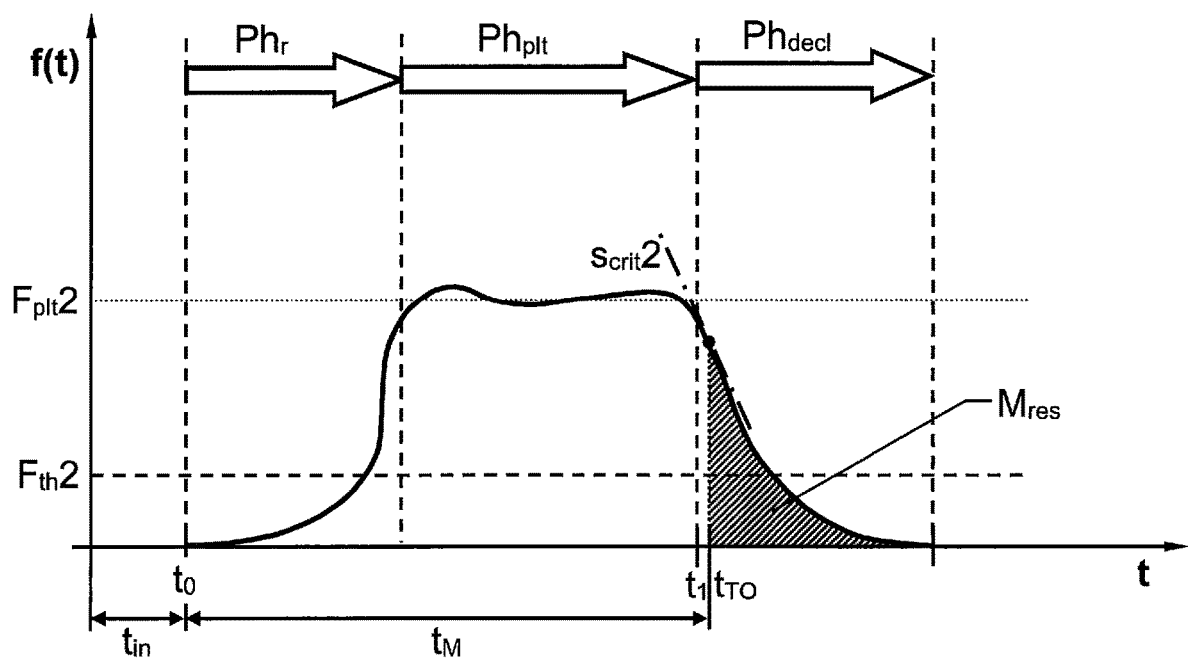
Fig. 3c
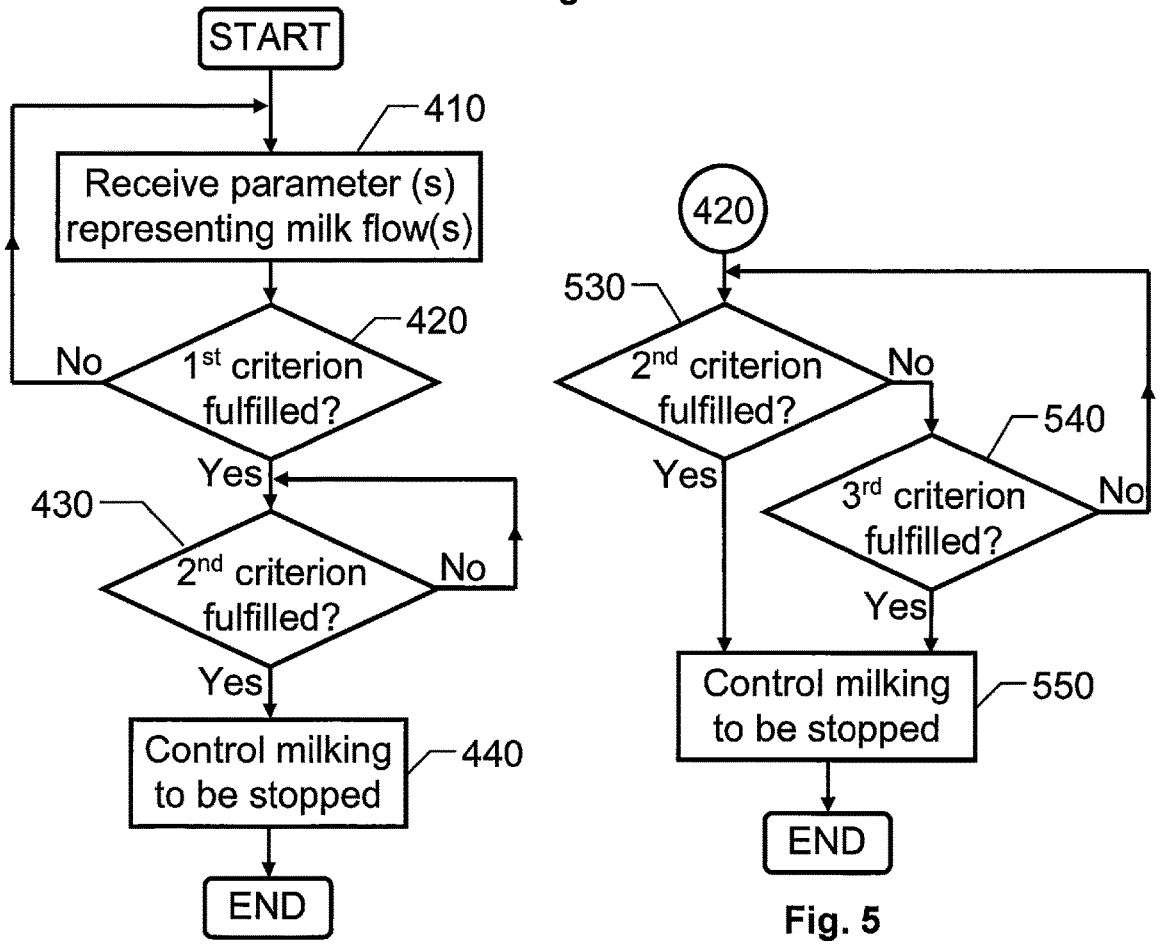
Fig. 4
Fig. 5

CONTROL UNIT, METHOD AND COMPUTER PROGRAM FOR A MILKING SYSTEM

CROSS-REFERENCE TO RELATED APPLICATIONS

This application is the U.S. national phase of International Application No. PCT/SE2019/050101 filed Feb. 7, 2019 which designated the U.S. and claims priority to Swedish Application No. 1850142-9 filed Feb. 9, 2018, the entire contents of each of which are hereby incorporated by reference.

TECHNICAL FIELD

The present invention relates generally to machine milking of dairy animals. More particularly the invention relates to a control unit for a milking system and method of controlling a milking system. The invention also relates to a computer program and a non-volatile data carrier.

BACKGROUND

As new and more advanced milking equipments are developed, the milking process has become completely automated, or at least almost. In such automatic milking systems, the low involvement of human operators requires that the milking system is capable of taking adequate decisions as when to stop extracting milk from each animal. Due to the wide variety in milk flow characteristics between different animals as well as for a particular animal between different milking occasions, it is a far from trivial task to determine the optimal milking time.

DE 36 09 275 A1 describes a milk removal method, wherein the flow of milk is detected in at least one teat, and based thereon; a milk-flow profile is derived. The milk-flow profile indicates a temporal dependence of the quantity of milk obtained within individual pulsation cycles. This, in turn, serves as a basis for a vacuum application parameter for a following milking operation.

V. Tančin et al., "Sources of Variation in Milk Flow Characteristics at Udder and Quarter Levels", Journal of Dairy Science, No. 89, American Diary Science Association, 2006, pp 978-988 discusses milk flow patterns and variations in milk flow characteristics throughout the lactation cycle. Inter alia, the longest duration of decline phase was found at the beginning and end of lactation in quarters with high peak flow rate and in rear quarters. It is also speculated if cow preparation for milking and vacuum modification plays a role in the duration of decline phase at quarter level.

However, there is yet no example of a fully automatic procedure for determining an individually adapted milking time that is optimal for each animal.

SUMMARY

The object of the present invention is therefore to offer a solution for controlling a milking machine to stop the milk extraction at a point in time that is ideal with respect to both long-term milk yield and animal health.

According to one aspect of the invention, the object is achieved by a control unit for a milking system, where the control unit includes processing circuitry and interfaces configured to receive at least one parameter representing at least one measured flow of milk being extracted from at least one teat of an udder of an animal that is milked via at least one teatcup. The at least one parameter may thus either represent a common flow of milk from all the teats of the udder, or a specific flow of milk from an individual teat. Based on the at least one parameter, the processing circuitry is configured to control the extraction of milk to be stopped. More precisely, the processing circuitry is configured to determine a take-off time when the milking shall be stopped based on first and second criteria. The first criterion indicates that the at least one flow has reached a decline phase. The second criterion indicates that the at least one flow decreases faster than a threshold slope, and the take-off time is determined in response to the second criterion being fulfilled on or after a point in time when the first criterion has been fulfilled.

The processing circuitry is configured to determine that the at least one flow has reached the decline phase based on a series of flow values registered during a current milking, and/or historic milk-flow-profile data for the animal being milked.

This control unit is advantageous because it provides a milking time being just right for animals that have widely different milk-flow profiles, for example in terms of rise time, plateau-phase flow level and the extension of the decline phase.

It is advantageous to determine that the decline phase has been reached based on a series of flow values registered during a current milking or a historic milk-flow-profile data for the animal being milked. Namely, in the former case, the decision-making can be made independent from animal identity, and in the latter case the basis for the decision can be gradually enhanced over time.

It is further advantageous to register a series of flow values because such data may serve as a basis for determining a transition point between the plateau phase and the decline phase in the milk-flow profile. If, for example, an average time derivative of the milk flow changes from lying in an interval of relatively low time derivative, positive or negative, to a relatively high negative value, this may be construed as the end of the plateau phase and the beginning of the decline phase, i.e. that the first criterion is fulfilled.

According to one embodiment of this aspect of the invention, the stopping of the extraction of milk involves detaching at least one teatcup from a respective teat of the animal's udder, shutting off a milking vacuum to at least one teatcup and/or shutting off a pulsator vacuum to at least one teatcup. Thus, the milking can be stopped in a way that is adapted to the specific type of equipment used.

According to another embodiment of this aspect of the invention, the processing circuitry is configured to determine that the second criterion is fulfilled exclusively based on that the at least one flow decreases faster than the threshold slope. Thus, the teatcup detachment can be made fully independent from the milk flow level.

According to yet another embodiment of this aspect of the invention, the processing circuitry is configured to set the second criterion dynamically based on an average level of the flow during a plateau phase preceding the decline phase. This means that, if the average level of the flow during the plateau phase is comparatively high, the second criterion specifies a relatively steep threshold slope; and conversely, if the average level of the flow during the plateau phase is comparatively low, the second criterion specifies a relatively gentle threshold slope. In other words, the stop criterion requires a steeper decline phase for triggering in high milk-flow profiles than in low milk-flow profiles. Thus, in general, animals with a low overall milk flow will be allowed longer milking times than animals with high overall milk flow.

Preferably, the processing circuitry is configured to determine the take-off time in further response to a third criterion. This criterion is fulfilled if, after that, the first criterion has indicated that the flow has reached the decline phase, the flow decreases below a threshold level (before the second criterion is fulfilled). Consequently, even if the decline phase is very gentle, the milking will be aborted at an appropriate point, and over milking can be avoided.

According to one embodiment of this aspect of the invention, the processing circuitry is configured to set the first and second criteria based on an algorithm adapted to leave a particular estimated amount of milk in the udder after that the extraction of milk has stopped. Thereby, irrespective of the specific animal's current milk-flow profile, an appropriate milking will be carried out.

According to still another embodiment of this aspect of the invention, the processing circuitry is configured to set the third criterion dynamically based on an average level of the flow during a plateau phase preceding the decline phase, such that: if the average level of the flow during the plateau phase is comparatively high, the third criterion specifies a relatively high threshold level; and conversely, if the average level of the flow during the plateau phase is comparatively low, the third criterion specifies a relatively low threshold level. Analogous to the above, in general, this leads to that animals with a low overall milk flow will be allowed longer milking times than animals with high overall milk flow.

According to yet another embodiment of this aspect of the invention the processing circuitry is configured to determine the takeoff time on the further basis of: historic milk-yield data for the animal, historic milk-flow-profile data for the animal, a current lactation phase of the animal, an age of the animal, and/or a health status of the animal. Of course, this further improves the chances of obtaining an individually optimal milking time.

According to another aspect of the invention, the object is achieved by an automatic milking method comprising: receiving at least one parameter representing at least one measured flow of milk being extracted from at least one teat of an udder of an animal that is milked via at least one teatcup; and based on the at least one parameter, controlling the extraction of milk to be stopped. Specifically, a take-off time when the milking shall be stopped is determined based on first and second criteria, where the first criterion indicates that the at least one flow has reached a decline phase, and the second criterion indicates that the at least one flow decreases faster than a threshold slope. The takeoff time is determined in response to the second criterion being fulfilled on or after a point in time when the first criterion has been fulfilled. The advantages of this method, as well as the preferred embodiments thereof, are apparent from the discussion above with reference to the control unit.

According to a further aspect of the invention the object is achieved by a computer program loadable into a non-volatile data carrier communicatively connected to a processing unit. The computer program includes software for executing the above method when the program is run on the processing unit.

According to another aspect of the invention the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

FIGS. 3a-c show diagrams exemplifying how a set of proposed stop criteria can be applied depending on the characteristics of milk-flow profile; and FIGS. 4-5 illustrate, by means of flow diagrams, a general milking method according to the invention and an embodiment thereof respectively.

DETAILED DESCRIPTION

Figure 1:
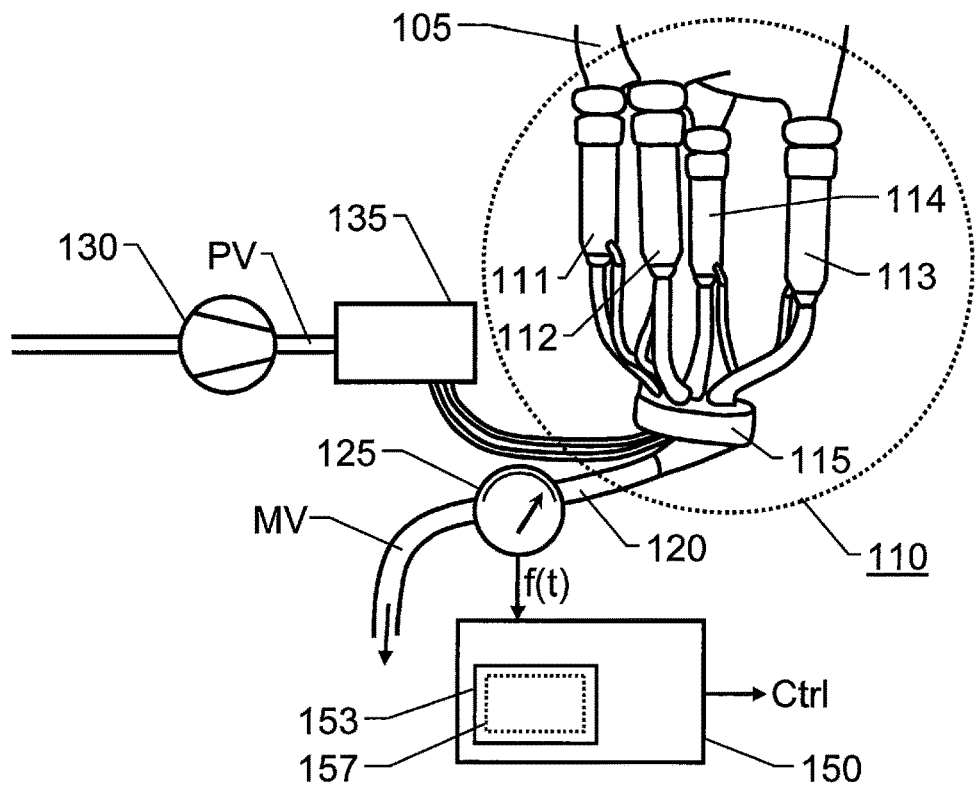
FIG. 1 shows a first embodiment of the invention adapted to be implemented in connection with a milking cluster for udder milking.

FIG. 1 shows a milking cluster 110 for udder milking, i.e. common milking of all the teats of an animal's udder 105. Here, a pulsator controller 135 is arranged to control a pulsator vacuum PV from a vacuum pump 130 to be applied repeatedly to milking teat cups 111, 112, 113 and 114 of the milking cluster 110. Typically, the vacuum pump 130 also provides a milking vacuum MV in a milk conduit 120 through which extracted milk is transported away from the udder 105.

The milking claw 115 is connected to the four teatcups 111, 112, 113 and 114 via respective milk and vacuum hoses. The teatcups 111, 112, 113 and 114, in turn, are attached to a respective teat of the udder 105. The pulsator vacuum PV is applied to all the four teatcups 111, 112, 113 and 114. Milk is extracted from the udder 105, collected in the milking claw 115 and forwarded through a milk conduit 120. A flow meter 125 registers a parameter representing a measured milk flow f(t) in the milk conduit 120. The measured milk flow f(t) may be registered either continuously or repeatedly at discrete time instances.

In any case, the parameter that represents the measured milk flow f(t) is forwarded to a control unit 150, which, in turn, is adapted to influence how a milking system is operated via a control signal Ctrl.

The term "milking system" here has a general meaning and may include e.g. a single milking cluster 110, a milking machine or a milking robot.

The control unit 150 contains processing circuitry and interfaces in order to enable the control unit 150 to receive data and signals, perform various analyses of said data and signals, and generate output, for example in form of the control signal Ctrl. More precisely, the control unit 150 is configured to receive the parameter representing the measured flow f(t) of milk being extracted from the udder 105 and based on this parameter control the extraction of milk to be stopped by means of the control signal Ctrl.

The extraction of milk may for example be stopped by detaching the teatcups 111, 112, 113 and 114 from a respective teat of the udder 105. A withdrawal cylinder or a milking robot may perform such a detachment in response to the control signal Ctrl. Alternatively, or in addition thereto, the pulsator vacuum PV and/or the milking vacuum MV may be shut off to the teatcups 111, 112, 113 and 114.

Figure 3A:
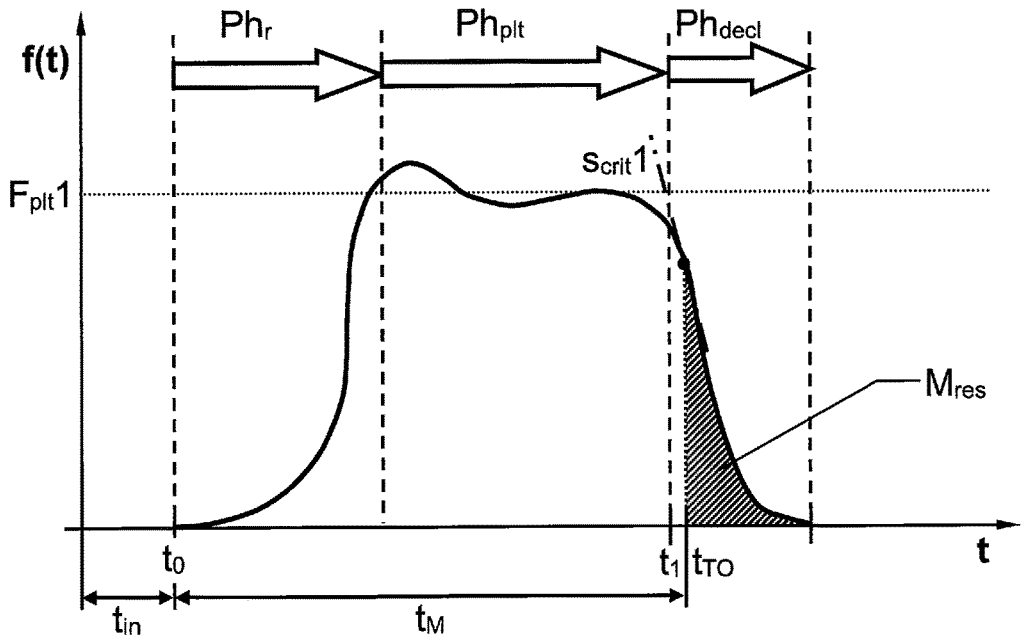

Referring now to the diagram in FIG. 3a, we will explain the criteria based upon which the processing circuitry in the control unit 150 is configured to determine a take-off time $t_{TO}$ when the milking shall be stopped.

The horizontal axis of the diagram in FIG. 3a represents time t, and the vertical axis represents the registered milk flow f(t) as a function of time t. We presume that the milking vacuum MV and the pulsator vacuum PV is applied to the teatcups 111, 112, 113 and 114 at t=zero, and that the resulting extraction of milk is initiated at a $t_{in}$ later point in time $t=t_0$. Then, a rise phase $Ph_r$ follows during which the milk flow f(t) increases relatively rapidly. Subsequently, the rise phase $Ph_r$ ends and a plateau phase $Ph_{plt}$ follows. This means that the milk flow f(t) lies rather stable at a level. In FIG. 3a, this is represented by an average level $F_{plt}1$ of the milk flow f(t). After that milk has been extracted for some time $t_1$, say 100-700 seconds, a decline phase $Ph_{decl}$ is initiated in which the milk flow f(t) begins to decrease. As will be discussed below, the slope at which the milk flow f(t) decreases in the decline phase $Ph_{decl}$ may vary substantially. FIG. 3a exemplifies a milk-flow profile with a comparatively steep slope in its decline phase $Ph_{decl}$.

According to one embodiment of the invention, determining that the milk-flow profile transitions from the rise phase $Ph_r$ to the plateau phase $Ph_{plt}$ is made based on a series of registered flow values. More precisely, the control unit 150 is preferably configured to study a temporal variation of the milk flow f(t) described by these flow values. For example, if an average time derivative of the milk flow f(t) changes from a relatively high positive value to lie in an interval of relatively low time derivative, positive or negative, the control unit 150 may construe this as the end of the rise phase $Ph_r$ and the beginning of the plateau phase $Ph_{plt}$. Analogously, if the average time derivative of the milk flow f(t) changes from lying in the interval of relatively low time derivative, positive or negative, to a relatively high negative value, the control unit 150 may construe this as the end of the plateau phase $Ph_{plt}$ and the beginning of the decline phase $Ph_{decl}$.

It has been found that it is beneficial both for the long-term milk yield and for the animal health if approximately the same amount of milk is left in the udder 105 after each milking. Therefore, according to one embodiment of the invention, the processing circuitry in the control unit 150 is configured to generate the control signal Ctrl at such a point in time $t_{TO}$ that a particular estimated amount of milk $M_{res}$ is left in the udder 105 after that the extraction of milk has stopped. This is accomplished via first and second criteria.

The first criterion indicates that the milk flow f(t) has reached the decline phase $Ph_{decl}$, and the second criterion indicates that the milk flow f(t) decreases faster than a threshold slope. In FIG. 3a, the second criterion is symbolized via a dot-dashed line $s_{crit}1$. The take-off time $t_{TO}$ is determined in response to fulfillment of the second criterion on or after the point in time $t_1$ when the first criterion has been fulfilled.

Figure 2:
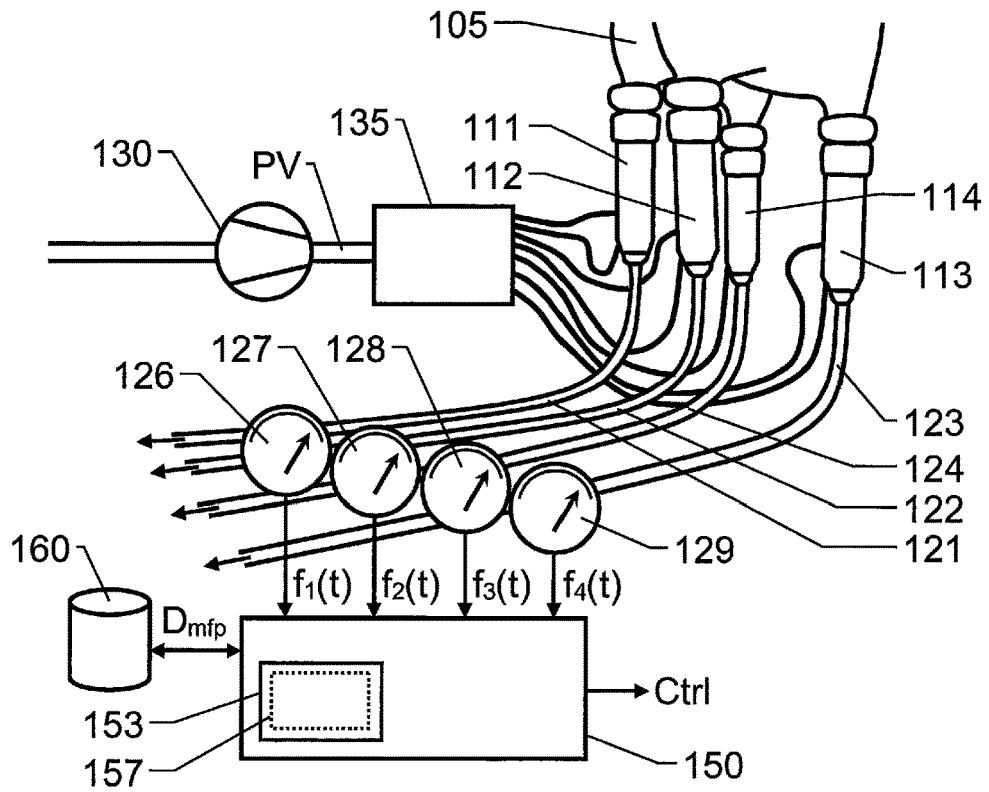
FIG. 2 shows a second embodiment of the invention adapted to be implemented in connection with individual teatcups for quarter milking.

Determining if the decline phase $Ph_{decl}$ has been reached can be made via signal processing that is based on a series of flow values registered during a current milking, via historic milk-flow-profile data $D_{mfp}$ for the animal being milked, or both. If historic milk-flow-profile data $D_{mfp}$ are to be used, a database 160 is communicatively linked to the control unit 150, so that milk-flow values f(t) can be both recorded and read repeatedly during the milking process. FIG. 2 shows an embodiment of the invention where such a database 160 is included.

Figure 3B:
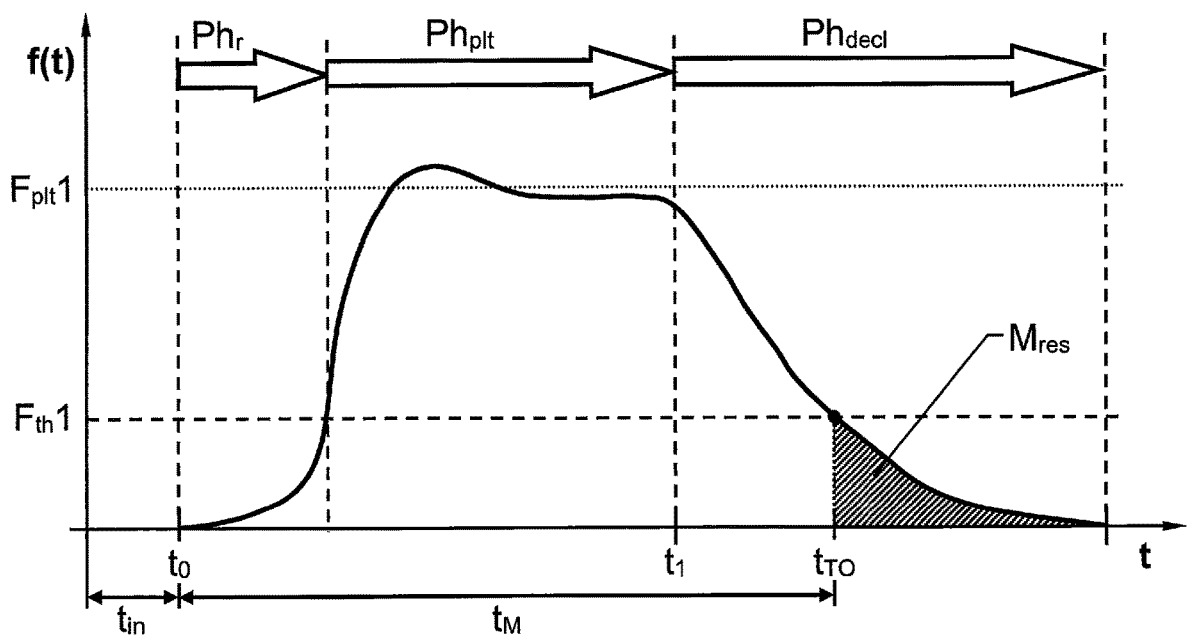

Referring now to FIG. 3b, we will discuss further aspects of the stop criteria. As is apparent from FIG. 3b, the milk-flow profile has a less steep decline phase $Ph_{decl}$ than in FIG. 3a. If the decline phase $Ph_{decl}$ is sufficiently gentle it may be the case that the second criterion, e.g. as symbolized via the dot-dashed line $s_{crit}1$, in FIG. 3a, is never fulfilled. Therefore, according to one embodiment of the invention, the processing circuitry is configured to determine the take-off time $t_{TO}$ in further response to a third criterion, which is fulfilled if, after that the first criterion has indicated that the milk flow f(t) has reached the decline phase $Ph_{decl}$, the milk flow f(t) decreases below a threshold level. In FIG. 3b, this level is represented by $F_{th}1$. Thereby, over milking can be avoided also for animals whose milk-flow profile has a very slightly sloping decline phase $Ph_{decl}$. Preferably, the threshold level $F_{th}1$ is set such that the particular estimated amount of milk $M_{res}$ is left in the udder 105 after that the extraction of milk has stopped. A total milking time $t_M$ is measured from to until the take-off time $t_{TO}$. Thus, at the take-off time $t_{TO}$, the particular estimated amount of milk $M_{res}$ should be left in the udder 105.

According to one embodiment of the invention, the processing circuitry in the control unit 150 is configured to set the second criterion dynamically based on the average level $F_{plt}$ of the milk flow f(t) during a plateau phase $Ph_{plt}$ that precedes the decline phase $Ph_{decl}$. This will be explained with reference to FIG. 3c, which shows a diagram over a milk-flow profile where an average level $F_{plt}2$ of the milk flow f(t) during the plateau phase $Ph_{plt}$ is comparatively low. Here, in order to leave the particular estimated amount of milk $M_{res}$ in the udder 105 at the take-off time $t_{TO}$, a relatively gentle threshold slope $s_{crit}2$ is set because the average level $F_{plt}2$ of the milk flow f(t) during the plateau phase $Ph_{plt}$ is comparatively low. Conversely, as shown in FIG. 3a, if the average level $F_{plt}1$ of the milk flow f(t) during the plateau phase Pho is comparatively high, the second criterion is set to specify a relatively steep threshold slope $s_{crit}1$.

Similarly, also aiming at leaving the particular estimated amount of $M_{res}$ in the udder 105, according to one embodiment of the invention, the processing circuitry in the control unit 150 is configured to set the third criterion dynamically based on the average level $F_{plt}$ of the flow f(t) during the plateau phase $Ph_{plt}$ preceding the decline phase $Ph_{decl}$. This means that, if the average level $F_{plt}1$ of the milk flow f(t) during the plateau phase $Ph_{plt}$ is comparatively high, the third criterion specifies a relatively high threshold level $F_{th}1$, for example as illustrated in FIG. 3b. Conversely, if the average level $F_{plt}2$ of the milk flow f(t) during the plateau phase $Ph_{plt}$ is comparatively low, the third criterion specifies a relatively low threshold level $F_{th}2$, for example as illustrated in FIG. 3c.

FIG. 2 shows a second embodiment of the invention, which is adapted to be implemented in connection with quarter milking, i.e. where the milk extraction can be controlled individually from each of the four teatcups 111, 112, 113 and 114 respectively.

Here, a particular flow meter 126, 127, 128 and 129 is arranged on a respective milk hose 121, 122, 123 and 124 from each of the teatcups 111, 112, 113 and 114, and the control unit 150 is configured to receive parameters representing measured milk flows $f_1(t)$, $f_2(t)$, $f_3(t)$ and $f_4(t)$ from each of the teatcups 111, 112, 113 and 114 respectively. The control unit 150 is further configured to control Ctrl the extraction of milk to be stopped based on said parameters, so that the take-off time $t_{TO}$ when the milking shall be stopped is determined based on: a first criterion indicating that at least one of the milk flows $f_1(t)$, $f_2(t)$, $f_3(t)$ and/or $f_4(t)$ has reached a decline phase $Ph_{decl}$; and a second criterion indicating that at least one of the milk flows $f_1(t)$, $f_2(t)$, $f_3(t)$ and/or $f_4(t)$ decreases faster than a threshold slope $s_{crit}1$ or $s_{crit}2$ respectively. Analogous to the above, the take-off time $t_{TO}$ is determined in response to fulfillment of the second criterion on or after a point in time $t_1$ when the first criterion has been fulfilled.

Preferably, in the quarter-milking embodiment of the invention illustrated in FIG. 2, the stopping of the extraction of milk may involve detaching the specific teatcup(s) of the teatcups 111, 112, 113 and/or 114 from the respective teat(s) of the udder 105 in respect of which teatcup(s) the above first and second criteria have been fulfilled. Alternatively, or in addition thereto, the stopping of the extraction of milk may involve shutting off the milking vacuum MV and/or the pulsator vacuum PV to each teatcup(s) of the teatcups 111, 112, 113 and/or 114 in respect of which teatcup(s) the above first and second criteria have been fulfilled.

In addition to the above-described first, second and third criteria, it is preferable if the processing circuitry in the control unit 150 is configured to determine the take-off time $t_{TO}$ on the further basis of historic milk-yield data for the animal, historic milk-flow-profile data for the animal, a current lactation phase of the animal, an age of the animal, and/or a health status of the animal. This information may be stored in the database 160, and be retrieved in response to registering an identity of an animal to be milked. As a result, the total milking time $t_M$ can be individually adapted with even better precision.

It is generally advantageous if the above-described control unit 150 is configured to effect the above-mentioned procedure in an automatic manner by executing a computer program 157. Therefore, the control unit 150 may include a memory unit, i.e. non-volatile data carrier 153, storing the computer program 157, which, in turn, contains software for making processing circuitry in the form of at least one processor in the control unit 150 execute the above-described actions when the computer program 157 is run on the at least one processor.

Although the invention is primarily intended to control a system for extracting milk from cows, the proposed solution is equally well applicable for any other kind of livestock animals, such as goats, sheep, pigs, donkeys, yaks or buffaloes. Naturally, if the animal being milked has a number of teats different from four, e.g. two, the above-described quarter-milking scenario is adapted the relevant number of teats.

In order to sum up, and with reference to the flow diagram in FIG. 4, we will now describe the general method according to the invention of controlling a milking system where milk extraction has been initiated.

In a first step 410, at least one parameter is received, which at least one parameter represents a measured milk flow. Then, in a step 420, it is checked if a first criterion is fulfilled, which indicates that the at least one milk flow has reached a decline phase. If so, a step 430 follows; and otherwise, the procedure loops back to step 410 for continued reception of the milk-flow related parameter(s).

In step 430 it is checked if a second criterion is fulfilled, which indicates that the at least one milk flow decreases faster than a threshold slope. If so, a step 440 follows; and otherwise, the procedure loops back and stays in step 430.

In step 440, the milking machine is controlled to stop the extraction of milk. Thereafter, the procedure ends.

FIG. 5 illustrates, by means of a flow diagram, an embodiment of the invention for controlling a milking machine. Here, the initial reference sign 420 represents the above-described steps 410 and 420

In a step 530 thereafter, it is checked if the second criterion is fulfilled, i.e. if the at least one milk flow decreases faster than a threshold slope. If so, a step 550 follows; and otherwise, the procedure continues to a step 540.

In step 540 it is checked if the at least one milk flow has decreased below a threshold level. If so, step 550 follows; and otherwise, the procedure loops back to step 530.

In step 550, the milking machine is controlled to stop the extraction of milk. Thereafter, the procedure ends.

All of the process steps, as well as any sub-sequence of steps, described with reference to FIGS. 4 and 5 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. An electronic control unit (150) for an automated milking system, the control unit (150) comprising:
   a processing circuitry, a data storage in communication with said processing circuitry, and interfaces configured to communicate with a flow meter, which registers a parameter representative of a measurement of flow f(t) of milk drawn from one or more teats of an udder (105) of an animal milked via one or more teatcups operated by the control unit in a milking operation, and also configured to communicate with and control the automated milking system, said data storage having a program code stored thereon that in operation causes the processing circuitry to:
   receive, during the milking operation, a series of values from the flow meter, each value representative of the measured flow of the milk being drawn from the animal at a point in time during the milking operation;

determine, as a first criterion, whether said series of values received by the control unit from the flow meter during the milking operation indicates the milking operation has entered a decline phase, said decline phase defined as an interval of time where the measured flow of the milk during the milking operation as indicated by said series of values is decreasing with time;

determine from said series of values, as a second criterion, whether a rate of decrease of the measured flow of the milk exceeds a decline threshold;

determine from said series of values, as a third criterion, whether the measured flow of the milk is below a flow threshold; and generate and transmit a control signal (Ctrl) to the automated milking system that stops the automated milking system from extracting milk from the animal upon satisfaction of either of:
  i) both the first criterion, where said processing circuitry has determined that said series of values received by the control unit from the flow meter during the milking operation indicates the milking operation has entered the decline phase, and the second criterion, where said processing circuitry has determined that the rate of decrease of the measured flow of the milk exceeds the decline threshold, or
  ii) both the first criterion, where said processing circuitry has determined that said series of values received by the control unit from the flow meter during the milking operation indicates the milking operation has entered the decline phase, and the third criterion, where said processing circuitry has determined from said series of values that the measured flow of the milk is below the flow threshold.

2. The control unit (150) according to claim 1, wherein the parameter registered by the flow meter represents a common flow of milk drawn from all the teats of the udder (105) of the animal during the milking operation.

3. The control unit (150) according to claim 1, wherein the stopping of the extraction of milk involves at least one of:
  detaching at least one of the one or more teatcups from a respective teat of the udder (105) of the animal,
  shutting off a pulsator vacuum (PV) to at least one of the one or more teatcups, and
  shutting off a milking vacuum (MV) to at least one of the one or more teatcups.

4. The control unit (150) according to claim 1, wherein the processing circuitry sets the decline threshold of the second criterion dynamically based on an average level of the measured flow of the milk determined for a plateau phase of the milking operation preceding the decline phase, such that:
  when the average level of the measured flow of the milk during the plateau phase is comparatively high, the second criterion specifies a relatively larger decline threshold, and
  when the average level of the measured flow of the milk during the plateau phase is comparatively low, the second criterion specifies a relatively smaller decline threshold.

5. The control unit (150) according to claim 1, wherein the processing circuitry determines that the second criterion is satisfied based on the rate of decrease of the measured flow of the milk exceeding the decline threshold regardless of an actual flow rate before or after said decline phase.

6. The control unit (150) according to claim 1, wherein the processing circuitry sets the flow threshold of the third criterion dynamically based on an average level of the measured flow of the milk determined for a plateau phase of the milking operation preceding the decline phase, such that:
  when the average level of the flow during the plateau phase is comparatively high, the third criterion specifies a relatively high flow threshold, and
  when the average level of the flow during the plateau phase is comparatively low, the third criterion specifies a relatively low flow threshold.

7. The control unit (150) according to claim 1, wherein the program code is further configured so that the processing circuitry generates and transmits the control signal for stopping the automated milking at such time so as to leave an amount of milk (M res)) in the udder (105) of the animal after the extraction of milk from the animal has stopped.

8. The control unit (150) according to claim 1, wherein the program code is further configured so that the processing circuitry generates and transmits the control signal for stopping the automated milking on further basis of at least one of:
  historic milk-yield data for the animal, stored in the data storage of the control unit;
  historic milk-flow-profile data for the animal, stored in the data storage of the control unit;
  a current lactation phase of the animal, stored in the data storage of the control unit;
  an age of the animal, stored in the data storage of the control unit; and
  a health status of the animal, stored in the data storage of the control unit.

9. The control unit (150) according to claim 1, wherein the processing circuitry is configured to determine that the measured flow of the milk has reached the decline phase further based on a historic milk-flow-profile data ($D_{mfp}$) for the animal being milked, stored in the data storage of the control unit.

10. An automatic milking method, comprising:
  receiving, at a control unit, a series of values from a flow meter, each value representative of a flow, measured by the flow meter, of milk being extracted from at least one teat of an udder (105) of an animal that is milked via one or more teatcups of an automated milking system during a milking operation;
  at the control unit, determining, as a first criterion, whether said series of values received by the control unit from the flow meter during the milking operation indicates the milking operation has entered a decline phase, said decline phase defined as an interval of time where the measured flow of the milk during the milking operation as indicated by said series of values is decreasing with time;
  when the first criterion is determined as satisfied when said series of values received by the control unit from the flow meter during the milking operation indicates the milking operation has entered the decline phase, determining, from said series of values at the control unit:
    as a second criterion, whether a rate of decrease of the measured flow of the milk exceeds a decline threshold, and
    as a third criterion, whether the measured flow of the milk is below a flow threshold;
  and controlling, by means of the control unit, the extraction of milk from the animal by way of the milking operation to be stopped upon satisfaction of either of:
    i) both the first criterion, where said control unit has determined that said series of values received by the control unit from the flow meter during the milking operation indicates the milking operation has entered the decline phase, and the second criterion, where said control unit has determined from said series of values that the rate of decrease of the measured flow exceeds the decline threshold, or ii) both the first criterion, where said control unit has determined that said series of values received by the control unit from the flow meter during the milking operation indicates the milking operation has entered the decline phase, and the third criterion, where said control unit has determined from said series of values that the measured flow of the milk is below the flow threshold.

11. The method according to claim 10, wherein each value received from the flow meter represents a common flow of milk drawn from all the teats of the udder (105) of the animal.

12. The method according to claim 10, wherein, in controlling the extraction of milk to be stopped, the control unit causes the automated milking system to carry out at least one of:
   detaching at least one of the one or more teatcups from a respective teat of the udder (105) of the animal,
   shutting off a pulsator vacuum (PV) to at least one of the one or more teatcups, and
   shutting off a milking vacuum (MV) to at least one of the one or more teatcups.

13. The method according to claim 10, further comprising:
   setting the decline threshold of the second criterion dynamically based on an average level ($F_{plt}$) of the measured milk flow determined for a plateau phase of the milking operation preceding the decline phase, such that:
      when the average level of the measured milk flow during the plateau phase is comparatively high, the second criterion specifies a relatively larger decline threshold, and
      when the average level of the measured milk flow during the plateau phase is comparatively low, the second criterion specifies a relatively smaller decline threshold.

14. The method according to claim 10, wherein the second criterion is determined to be satisfied based on the rate of decrease of the measured flow of the milk exceeding the decline threshold regardless of an actual flow rate before or after said decline phase.

15. The method according to claim 10, further comprising:
   setting the flow threshold of the third criterion dynamically based on an average level of the measured flow of the milk determined for a plateau phase of the milking operation preceding the decline phase, such that:
      when the average level of the flow during the plateau phase is comparatively high, the third criterion specifies a relatively high flow threshold level, and
      when the average level of the flow during the plateau phase is comparatively low, the third criterion specifies a relatively low flow threshold level.

16. The method according to claim 10, wherein the extraction of milk from the animal by way of the milking operation is controlled to be stopped at such time so as to leave an amount of milk ($M_{res}$)) in the udder (105) of the animal after the extraction of milk from the animal has stopped.

17. The method according to claim 10, wherein the controlling of the extraction of milk to be stopped is carried out on the further basis of at least one of:
   historic milk-yield data for the animal;
   historic milk-flow-profile data for the animal;
   a current lactation phase of the animal;
   an age of the animal; and
   a health status of the animal.

18. A non-transitory data carrier (153) having recorded thereon a computer program (157) comprising software that, upon execution by a processing unit (150), causes the processing unit (150) to execute the method according to claim 10.

19. The method according to claim 10, wherein the measured flow is determined by the control unit to have reached the decline phase further based on a historic milk-flow-profile data ($D_{mfp}$) for the animal being milked, stored in a data storage of the control unit.

* * * * *